June 5, 1951
W. M. NICHOLS
2,555,653
GAS CONTROL SYSTEM
Filed Aug. 18, 1948
2 Sheets-Sheet 1
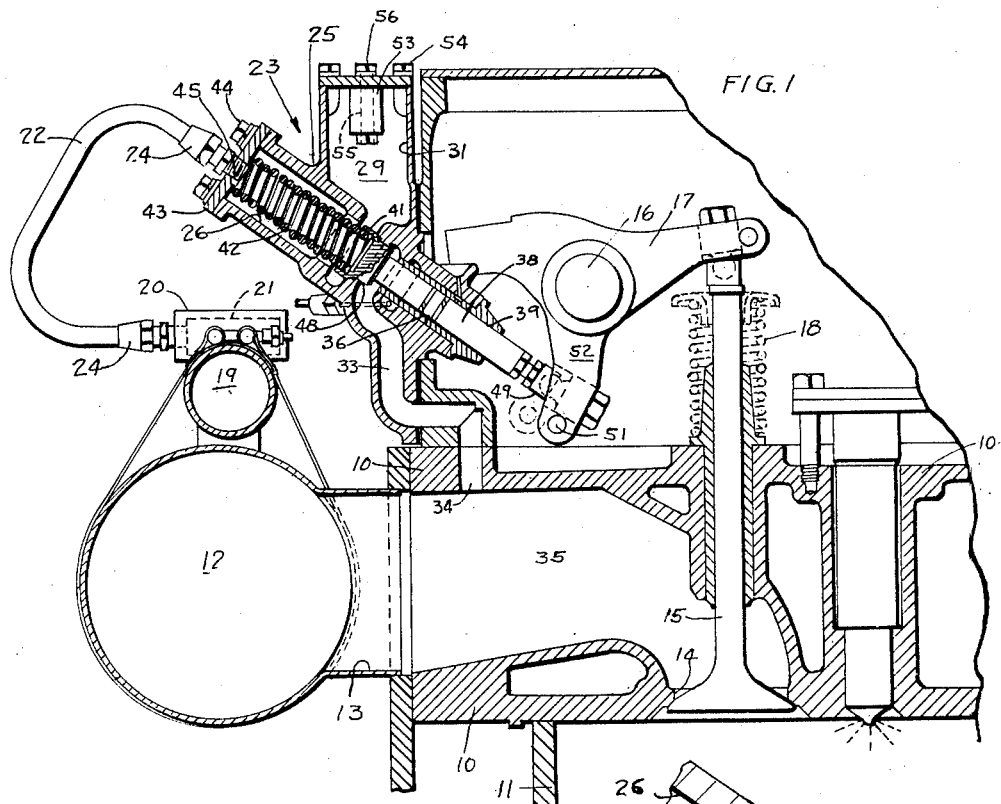
FIG. 1
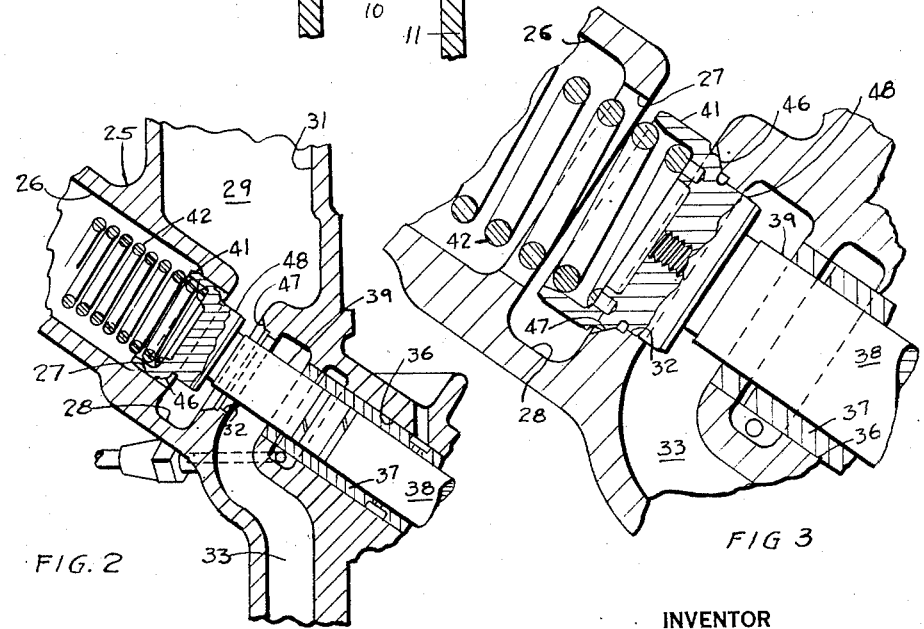
FIG. 2
FIG. 3
INVENTOR
WILLIAM M. NICHOLS
BY Maurice W. Grady
ATTORNEY

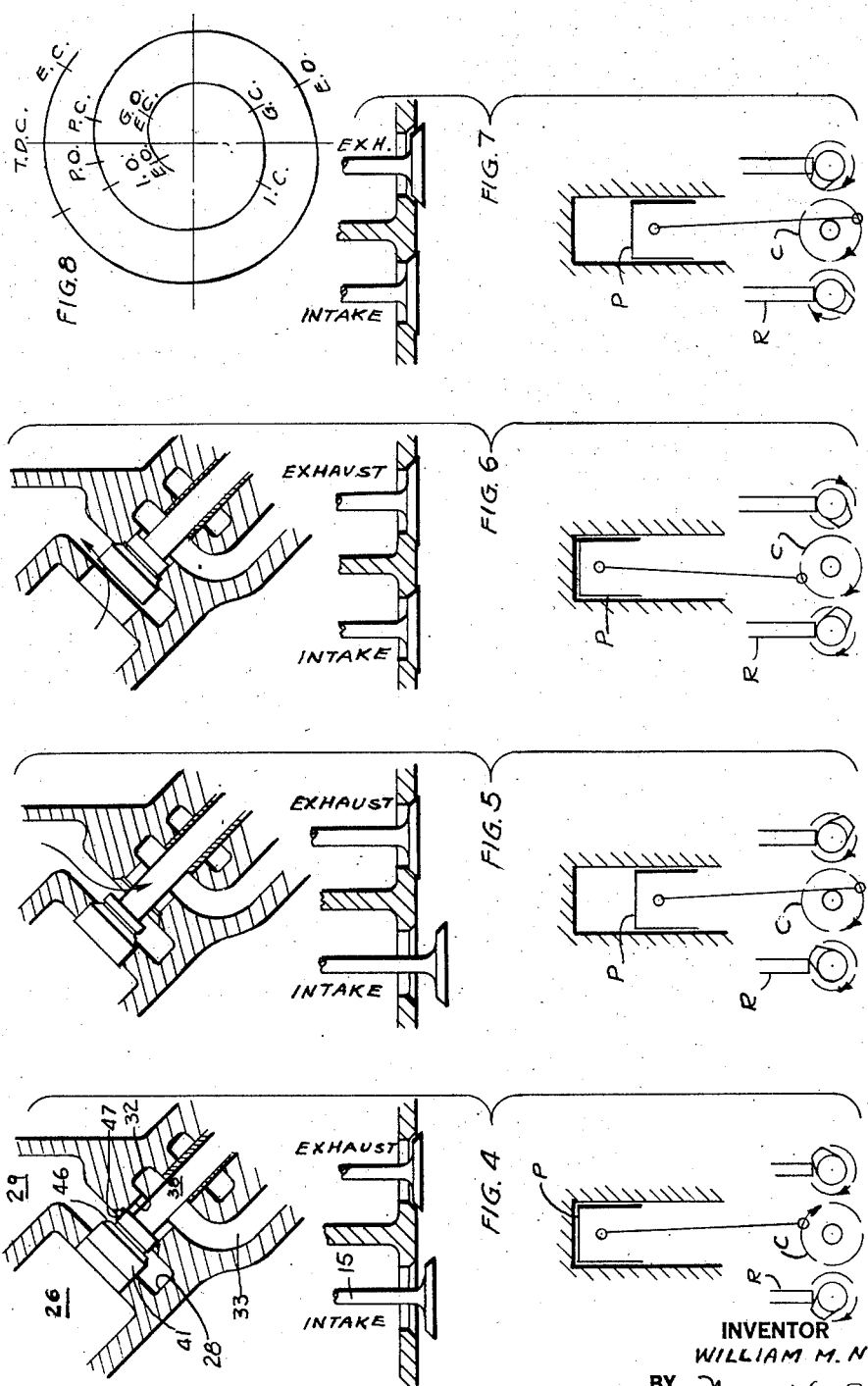

Patented June 5, 1951

2,555,653

UNITED STATES PATENT OFFICE 2,555,653

GAS CONTROL SYSTEM

William M. Nichols, Schenectady, N. Y., assignor to American Locomotive Company, New York, N. Y., a corporation of New York Application August 18, 1948, Serial No. 44,863

10 Claims. (Cl. 123—27)

This invention relates to a gas control system and particularly to such a system for the supply of gas to a dual fuel internal combustion engine.

A dual fuel internal combustion engine, when operating on gas, is supplied with a lean mixture of gas and air. Because of the high compression ratio of an engine operating on the Diesel principle, too rich a mixture of gas and air might result in serious detonations with consequent danger and damage to the engine. It is therefore necessary that the mixture be kept sufficiently lean for safety.

Another problem encountered when a dual fuel engine is operating on gas results from a residue of gas remaining in the chamber adjacent the engine cylinder after the inlet valve closes at the end of the suction stroke. In the prior art, at the end of the exhaust stroke an interval is provided for scavenging the cylinder with unmixed air. This interval is between the opening of the inlet valve and the closing of the exhaust valve. When sufficient unmixed air has been supplied for scavenging, gas is then admitted to the air stream for entrance into the engine cylinder for combustion purposes. If the gas thus admitted is not accurately controlled, some of the gas will not have entered into the cylinder by the time the inlet valve closes and will remain in the mixing chamber adjacent the inlet valve until such valve opens on the next suction stroke. For the gas to remain in this position is undesirable, first because it will be blown through the cylinder during the scavenging period and wasted and, secondly, because it will be dangerous in case of backfiring.

The principal object of this invention is to provide an apparatus which will supply to the stream of combustion-supporting air in an internal combustion engine a metered amount of gas which will mix with the air stream for admission to the engine cylinder at a predetermined degree of leanness.

Another object of this invention is to provide such a metering apparatus which includes an accumulator of adjustable volume which at timed intervals is out of communication with the gas manifold but at timed intervals supplies predetermined amounts of gas to the air stream to produce a mixture of desired leanness for supply to the engine cylinder.

A further object of this invention is to provide an apparatus which will supply to the stream of scavenging air in an internal combustion engine, after such air has completed its scavenging function, a predetermined amount of gas for mixture therewith and to admit the entire amount of such mixture to the cylinder for combustion, such apparatus being so designed that it will not at any instant allow open communication between the combustion cylinder and gas supply line.

A further object of the invention is to provide an accumulator in the gas supply line adjacent the inlet passage, having associated therewith a control valve which in one position will permit the accumulator to be filled with gas from the gas supply line while sealing off communication between the gas line and the combustion cylinder, and which in another position will permit gas to escape from the accumulator to the combustion cylinder but will seal off communication between the combustion cylinder and the supply line, the accumulated gas, thus relayed, advancing into the inlet passage for mixture with the scavenging air to create a gas and fuel mixture, the entire quantity of which will be supplied to the combustion cylinder after the completion of scavenging but before the closing of the inlet valve.

Another object of this invention is to provide apparatus which will scavenge an internal combustion engine with a stream of unmixed air which will, at the completion of the scavenging, have gas entrained for mixture therewith for purposes of combustion, the supply of gas being thereafter cut off from entrainment with the air stream at such a time that all the gas mixture will have advanced into the combustion cylinder before the inlet valve closes.

A further object of this invention is to provide such apparatus for the mixing of a predetermined amount of gas with the air stream in the inlet passage after such air has completed its scavenging function and so that such mixture will be entirely admitted into the combustion cylinder after the scavenging has been completed but before the inlet valve closes, thus leaving no residue of the mixture in the inlet passage.

Still another object is to provide a gas control device for such purpose which includes a valve actuated by the inlet-valve rocker arm to control the supply of gas to an accumulator and then releases such accumulated gas to the engine cylinder in timed relation to and for mixture with intermittently supplied combustion-supporting air which first functions to scavenge the cylinder.

Another object is to provide such a gas control device including an accumulator connected to the gas line and a reciprocating valve having a body portion adapted in the seated position of the valve to seal off the supply of gas to the engine cylinder until air advancing into the cylinder from the air manifold shall have scavenged the engine cylinder, and which in the unseated position permits the gas to move from the accumulator to mix with the air supply for combustion in the cylinder, such valve being reciprocably actuated by the engine cylinder inlet-valve rocker arm.

Other and further objects of this invention will appear from the following description, the accompanying drawings, and the appended claims.

In the accompanying drawings, which illustrate one preferred embodiment of my invention:

Fig. 1 is a view, partly in section and partly in elevation, of the gas control system of the present invention in which the gas control valve is shown in closed position so that gas may be supplied to the accumulator but will be prevented from passing into the mixing chamber;

Fig. 2 is an enlarged sectional view of the gas control valve shown in open position so that gas may be supplied from the accumulator to the mixing chamber;

Fig. 3 is a still further enlarged view of the gas control valve in closed position;

Figs. 4 to 7 inclusive are diagrammatic representations of the piston in various cyclical positions with the inlet and exhaust valves and the driving cams and portions of the rocker arm push rods in operative positions usual in four-cycle internal combustion engines, the gas control valve being shown in various corresponding operative positions in accordance with the invention. The gas control valve is omitted from Fig. 7 since it is the same as shown in Fig. 6;

Fig. 8 is a diagram showing the points on the Otto cycle of the opening and closing of the gas control valve.

In the drawings, reference letters have been assigned to the principal operative parts shown diagrammatically in Figs. 4 to 7. But from time to time in the specification, some of these parts are referred to as "not shown," meaning thereby that they do not appear in the drawings of the actual device (Figs. 1 to 3). In Fig. 8 further reference letters have been applied as hereinafter more fully described to indicate the timing of the opening and closing of the engine cylinder valves and the gas control valve.

Referring to the drawings in detail:

Fig. 1 shows a portion of a a cylinder head 10 mounted upon a cylinder 11 in which the usual driving piston reciprocates. The cylinder may form part of a bank of like cylinders which are integrated into either a naturally aspirated or a supercharged dual fuel engine; and with the piston and other elements shown herein is illustrative of all the other power units. In the illustrative embodiment, the cylinder 11 is supplied with supercharged air which passes thereto from the air manifold 12, through passage 13 and port 14, the latter being controlled by inlet valve 15. Gas will be supplied to the chamber 35 to mix with the air in the manner hereinafter more fully described. The exhaust system of the engine and the source of supercharging air have not been shown as they are conventional and form no part of the present invention.

The engine has the usual cam shaft (shown as C in Figs. 4 to 7) which is operatively connected by push rod R with rotary shaft 16 to impart rocking motion to the valve lever or rocker arm 17 for the purpose of opening the inlet valve 15. Valve 15 is returned to closed position by valve compression spring 18. The exhaust valve (shown diagrammatically in Figs. 4 to 7) is similarly controlled by a rocker arm (not shown) operatively connected with the cam shaft, and is also returned to closed position by a compression spring.

Gas, at a predetermined pressure (in the apparatus of the invention, it is about thirty pounds at full load), is supplied to the cylinder 11 by a pump (not shown) through the manifold 19. A fitting 20, in the shape of a rectangular block and having a limited bore 21 therein in communication with an arcuate cut-out portion is disposed through the upper portion of the manifold so that bore 21 is arranged perpendicularly to the axis of the manifold. Bore 21 intercepts the flow of gas through the manifold to establish communication with the gas line 22 thereby to transmit gas to the control valve assembly, generally indicated at 23. The gas line is connected at its ends to the fitting 20 and the valve assembly 23 by suitable couplings 24.

The control valve assembly 23 comprises a housing 25 having a chamber 26 therein which communicates through the cylindrical passage 27 (Figs. 2 and 3) with the reservoir 28. Reservoir 28 opens into an accumulator 29, the casing 31 of which is fabricated integrally with the valve housing. Reservoir 28 is also in communication, through passage 32, with the gas conductor 33 which is formed in the housing in a curved path to exhaust through the port 34 in the mixing chamber 35 formed at the inner end of the passage 13. The valve housing 25 is also provided with a bore 36 extending longitudinally through the housing in axial alignment with the chamber 26. Within bore 36 is disposed a guide bushing 37 through which a valve 38 reciprocates.

Valve 38 comprises a stem 39 and a cup-shaped head 41 for the reception of the inner end of the compression return spring 42, the outer end of which is positioned against the lid 43. The lid 43, which is secured to the housing by bolts 44, has a threaded central receiving bore 45 for the reception of the gas line coupling 24. The outside diameter of the valve head 41 is precision machined for a close sliding fit into the cylindrical passage 27. A circular tapered shoulder 46 is formed upon the valve head 41 and is adapted for seating upon the circular tapered seat 47 formed adjacent the passage 32. Between the valve head 41 and stem 39, the valve has a central body portion 48 which is precision machined to slideably fit the cylindrical passage 32 (see Fig. 3). The inner or lower end of the valve stem 39, urged by spring 42, contacts fitting 49 which is connected, by means of a pivot pin 51, to an arm 52 formed integrally with the valve lever or rocker arm 17.

In operation, rocker motion is imparted by the engine cam shaft to the rocker arms to open the inlet and exhaust valves of the power cylinder. Both valves are closed by return springs, as already indicated. The sequence of the opening and closing of the inlet and exhaust valves is indicated on the graph of Fig. 8. When the inlet valve is in closed position, the gas control valve 38 is in its first or open position (as shown in Fig. 3), and gas under pressure is admitted from manifold 19, through hose 22, chamber 26, passage 27, and reservoir 28 into accumulator 29. When the control valve is in this position, the gas remains confined in the accumulator for future use and is not permitted to advance through conductor 33 into chamber 35. As the rocker arm rotates clockwise to move the inlet valve to open position, the arm 52 rotates to move the valve 38 off its seat 47 against the opposition of spring 42. It is important to note, however, that the valve body portion 48 maintains the sealing-off of the advance of gas from the accumulator 29 into conductor 33 for a considerable period after the valve 38 begins to move away from its seat. Inlet valve 15 opens immediately upon the beginning of the clockwise movement of the rocker arm, and so air from the inlet passage enters the cylinder unmixed with gas before the valve body portion 48 clears the passage 32. This is the scavenging period. When portion 48 does finally clear passage 32, then, of course, gas from the accumulator will advance through the conductor 33 into the mixing chamber 35 for mixing and entrainment with the supercharged air from the manifold for supplying the cylinder during the suction stroke. As valve 38 moves away from its seat and before portion 48 clears passage 32, its head 41 slides into the passageway 27 to cut off any further supply of gas from chamber 26. Communication between the engine cylinder through the mixing chamber 35 and the gas manifold through the receiving chamber 26 is thus cut off whenever the inlet valve is open into the engine cylinder. This will eliminate any danger of a backfire extending back through the control valve into the gas line.

Air from the manifold is under pressure lower than the pressure of the gas from the gas manifold. In the illustrative embodiment, the pressure of the supercharged air on leaving the manifold is approximately five pounds, whereas the gas stored in the accumulator from the gas manifold is under approximately thirty pounds pressure. The pressure of the gas in the manifold is carefully predetermined as is the volume of the accumulator. Consequently, the amount of gas stored therein is known exactly. The accumulator and passages connecting the accumulator to the mixing chamber 35 have been so designed that the gas contained in the accumulator will have expanded sufficiently upon reaching the chamber 35 to drop to approximately five pounds, thereby to equalize the air manifold pressure. In effect, then, the accumulator acts as a metering device to furnish the cylinder with an exactly predetermined supply of gas at a desired pressure to be mixed with the air for combustion. The mixing of the gas with the air will provide a product of predetermined leanness, which will not detonate when subjected to the operating pressure in the power cylinder.

Upon the counterclockwise or return movement of the rocker arm 17, the compression spring 18 returns the inlet valve 15 to closed or seated position. The gas control valve is moved to its first or open position and a second supply of gas then enters the accumulator for the beginning of a second cycle in the manner previously described. The accumulator is provided with volume regulating means in the form of a cylindrical block 53 which is mounted on the inner side of the lid 54 by bolts 55 secured in position by nut 56. Block 53 may be replaced by other blocks of desired size to regulate the volume within the chamber available for gas storage. Other means for regulating such volume can easily be devised by those skilled in the art.

Referring now to Figs. 4 to 7 inclusive, it will be observed, as shown in Fig. 4, that when the piston P has just passed top dead center, at the end of the exhaust stroke, the inlet valve is open, the exhaust valve is open but just about to close, and the gas control valve 38 is about to close (to prevent communication between chamber 26 and the accumulator 29). Instantly thereafter, as the piston moves slightly downward, the exhaust valve and the gas control valve close, permitting gas to pass the valve seat 47 and through the annular passage 32 into the conductor 33, and thence to the chamber 35 for mixture with the air flow for advancing into the cylinder 11. It is to be again noted that the volume of the accumulator is exactly predetermined so that when the gas is furnished thereto under predetermined pressure, an exact amount becomes available for mixture with the air and that, accordingly, a product of predetermined leanness is supplied to the engine cylinder.

Fig. 5 shows the position of the various elements just before the piston has reached the end of the suction stroke. The inlet valve 15 is open, permitting the mixture of gas and air to advance from the chamber 35 into the cylinder 11, and the exhaust valve is closed to prevent the escape of the combustible mixture from the cylinder. The gas control valve is closed by the movement of its head 41 into the annular passage 27, thus shutting off communication between the engine cylinder and the gas line.

In Fig. 7 the piston has almost reached the end of the power stroke, and the exhaust valve is just beginning to open. The gas control valve is seated and is in sealing-off position so that there is still no continuous communication between the combustion cylinder and the gas line. As the exhaust cycle begins, the exhaust valve has opened, and shortly before the piston reaches top dead center, the inlet valve opens to permit an influx of scavenging air. At this point, the gas control valve starts to move outwardly, but because of the length of the central body portion 48, as previously pointed out, the accumulator remains sealed off from communication with the cylinder. If the gas mixture, supplied in the previous cycle, has not been completely advanced into the cylinder before the inlet valve closes, a wasteful and sometimes dangerous condition will exist. Since the air in the inlet passage (or mixing chamber) in the devices of the prior art will rush into the cylinder the instant that the piston starts moving downwardly, any residual gas that may remain in the inlet passage or mixing chamber will be blown through the cylinder in the scavenging operation and wasted. Since, however, the supply of gas in the accumulator of the instant invention is exactly metered, and the cubic content of the accumulator and connecting passageways have been designed according to exact computations, there is little likelihood of any residual gas being found in the mixing chamber at this point. If, however, any such residue should remain in the mixing chamber, protective measures have been taken to prevent any difficulties arising in the event of a backfire.

In Fig. 8 reference letters are shown on a time chart wherein TDC indicates "top dead center." The inner end of the spiral graph is the point at which the inlet valve opens, at the beginning of the scavenging period, the exhaust being also open, "IO" and "EO" respectively indicating such positions. Further along in clockwise direction on the spiral, "EC" indicates the point at which the exhaust valve closes at the end of the scavenging period and "GO" the point where the gas control valve opens to establish communication between the gas accumulator and the engine cylinder. "GC" is the point of the closing of the gas control valve. "IC" is the inlet valve closing point, and "EO" the exhaust valve opening point. "PO" and "PC" are the points of the opening and closing of the pilot fuel injector.

While there have been hereinbefore described approved embodiments of this invention, it will be understood that many and various changes and modifications in form, arrangement of parts, and details of construction may be made without departing from the spirit of the invention, and that all such changes and modifications as fall within the scope of the appended claims are contemplated as a part of this invention. For the purposes of clarity and simplicity, there are omitted from the drawings representations of various standard parts, accessories, and design details of a dual fuel internal combustion engine, since these, as such, form no part of the present invention and are felt to be unnecessary for a full presentation of the subject to those skilled in the art.

What I claim is:

1. In a dual fuel internal combustion engine, a control for the flow of gas from the gas manifold to the engine cylinder comprising a chamber to receive gas from the gas manifold, a gas accumulator in communication therewith, means connecting the gas accumulator with the engine cylinder, and a reciprocating valve which in one position will admit gas from the receiving chamber to the accumulator but will prevent its passage from the accumulator into the engine cylinder and which in a second position will permit the passage of gas from the accumulator to the engine cylinder but will prevent communication between the accumulator and the receiving chamber, said valve in all positions cutting off continuous communication between the receiving chamber and the engine cylinder.

2. In a dual fuel internal combustion engine having a gas manifold and an engine cylinder inlet valve actuated by a rocker arm operatively connected with the cam shaft, a control for the flow of gas from the gas manifold to the engine cylinder comprising a chamber to receive gas from the gas manifold, a gas accumulator in communication therewith, means connecting the gas accumulator and the engine cylinder, and a valve reciprocated by the rocker arm in timed relation to the movement of the inlet valve and which in one position will admit gas from the receiving chamber to the accumulator but will prevent its passage from the accumulator into the engine cylinder and which in a second position will permit the passage of gas from the accumulator to the engine cylinder but will prevent communication between the accumulator and the receiving chamber, said valve in all positions cutting off continuous communication between the receiving chamber and the engine cylinder.

3. In a dual fuel internal combustion engine of the class wherein gas and air are delivered by separate manifolds to a mixing chamber adjacent the engine cylinder and such mixture is admitted to the engine cylinder through an inlet valve actuated by a rocker arm operatively connected to the cam shaft, a gas control system comprising a housing, a gas receiving chamber in the housing, an accumulator in communication with the receiving chamber, connecting means between the accumulator and the mixing chamber, and a valve reciprocated in the housing by the rocker arm in timed relation to the movement of the inlet valve and which in one end position will admit gas from the receiving chamber to the accumulator but will cut off communication between the accumulator and the mixing chamber and which in a second end position will admit gas from the accumulator to the mixing chamber but will cut off communication between the accumulator and the receiving chamber, said valve in all its intermediate positions cutting off continuous communication between the receiving chamber and the engine cylinder.

4. In a dual fuel internal combustion engine, a control for the flow of gas from the gas manifold to the engine cylinder comprising a housing, a chamber in the housing to receive gas from the gas manifold, a gas accumulator, a cylindrical passage between the receiving chamber and the gas accumulator, means connecting the accumulator and the engine cylinder, a valve seat in such connecting means, a second cylindrical passage in the housing in axial alignment with the first cylindrical passage, and a reciprocating gas control valve having a head adapted to slideably fit the first cylindrical passage, a seating portion adapted to fit the valve seat, and a body portion adapted to slideably fit the second annular passage, said valve shutting off communication between the receiving chamber and the accumulator when its head is moved into the first annular passage and permitting communication between the accumulator and the engine cylinder when its body portion moves out of the second annular passage, the head and body portion of the valve being so arranged in relation to the annular passages that communication between the receiving chamber and the engine cylinder is at no time permitted.

5. In a dual fuel internal combustion engine having a gas manifold and an engine cylinder inlet valve actuated by a rocker arm operatively connected with the cam shaft, a control for the flow of gas from the gas manifold to the engine cylinder comprising a housing, a chamber in the housing to receive gas from the gas manifold, a gas accumulator, a cylindrical passage connecting the receiving chamber and the gas accumulator, means connecting the accumulator and the engine cylinder, a valve seat in such connecting means, a second cylindrical passage in the housing in axial alignment with the first cylindrical passage, and a gas control valve reciprocated by the rocker arm and having a head adapted to slideably fit the first cylindrical passage, a seating portion adapted to fit the valve seat, and a body portion adapted to slideably fit the second cylindrical passage, said valve shutting off communication between the receiving chamber and the accumulator when its head is moved into the first cylindrical passage and permitting communication between the accumulator and the engine cylinder when its body portion moves out of the second cylindrical passage, the head and body portion of the valve being so arranged in relation to the cylindrical passages that continuous communication between the receiving chamber and the engine cylinder is at no time permitted.

6. In a dual fuel internal combustion engine of the class which has an inlet valve operated by a rocker arm operatively connected with the cam shaft, a gas control system comprising a mixing chamber in communication with the engine cylinder through the inlet valve, a manifold for supplying air under pressure to the mixing chamber, a second manifold for supplying gas to the mixing chamber, the gas pressure in the gas manifold being greater than the air pressure in the air manifold, a gas control device arranged between the gas manifold and the mixing chamber which comprises a receiving chamber for gas from the gas manifold, a gas accumulator, a cylindrical passageway connecting the receiving chamber and the accumulator, a conductor connecting the accumulator and the mixing chamber, a valve seat in the conductor, a second cylindrical passageway between the accumulator and the conductor in axial alignment with the first cylindrical passageway, and a valve actuated by the inlet valve rocker arm and including a head adapted to slideably fit the first cylindrical passage, a seating portion adapted to slideably fit the second cylindrical passageway, and a body portion adapted to slideably fit the second cylindrical passage, said valve shutting off communication between the receiving chamber and the accumulator when its head is moved into the first cylindrical passage and permitting communication between the accumulator and the engine cylinder when the body is moved out of the second cylindrical passage, the head and body portion of the valve being so arranged in relation to the cylindrical passages that continuous communication between the receiving chamber and the engine cylinder is at no time permitted, and the combined volume of the accumulator and conductor being such that the gas confined to the accumulator will, upon expanding through the conductor, drop in pressure to equalize the pressure of the air supplied to the mixing chamber from the air manifold.

7. In a dual fuel internal combustion engine of the class wherein the inlet valve for the engine cylinder is actuated by a rocker arm operatively connected with the cam shaft, an engine cylinder, an inlet valve for the engine cylinder, a mixing chamber adjacent the engine cylinder and in communication therewith through the inlet valve, a manifold for supplying air to the mixing chamber, a manifold for supplying gas to the mixing chamber, a gas flow control device between the mixing chamber and the gas manifold which comprises a housing, a receiving chamber for gas from the gas manifold, a gas accumulator whose volume is variable at will, a first cylindrical passageway connecting the receiving chamber and the accumulator, a conductor connecting the accumulator and the mixing chamber, a second cylindrical passageway between the accumulator and the conductor, and a valve reciprocated by the inlet valve rocker arm and including a head, a seating portion, and a body portion, said valve operating to open and close communication between the receiving chamber and the accumulator when its head is moved respectively into and out of the first cylindrical passageway and to open and close communication between the accumulator and the mixing chamber when its body portion is moved respectively out of and into the second cylindrical passageway, said valve in all of its positions preventing continuous communication between the gas manifold and the engine cylinder.

8. In a dual fuel internal combustion engine of the class wherein gas and air under pressure are supplied by separate manifolds for mixture in a chamber adjacent the engine cylinder and are admitted to the cylinder through an inlet valve actuated by a rocker arm operatively connected with the cam shaft, a gas control system arranged between the gas manifold and the mixing chamber comprising a housing, a chamber in the housing for receiving gas from the gas manifold, a gas accumulator, a cylindrical passage connecting the receiving chamber and the accumulator, a conductor from the accumulator to the mixing chamber, a cylindrical passage connecting the accumulator and the conductor and in axial alignment with the first cylindrical passage, a valve seat in the second cylindrical passage, a valve guide bore in the housing in axial alignment with the cylindrical passages, and a valve reciprocated by the rocker arm, said valve having a head to slideably fit the first cylindrical passage, a seating portion, a body portion to slideably fit the second cylindrical passage, and a stem to slideably fit the guide bore, said valve head being clear of the first cylindrical passage when the valve is in seated position so that gas may move from the receiving chamber to the accumulator and said valve body portion being clear of the second cylindrical passage when the valve is in fully unseated position so that gas may move from the accumulator to the mixing chamber.

9. In a dual fuel internal combustion engine having separate manifolds to supply gas and air under pressure to the engine cylinder and of the class wherein the inlet valve is actuated by a rocker arm operatively connected with the cam shaft, a gas control system arranged between the gas manifold and the engine cylinder comprising a housing, a chamber therein to receive gas from the gas manifold, a gas accumulator in communication with the receiving chamber, a mixing chamber in communication at one end with the engine cylinder through the inlet valve and at the other end with the air manifold, a gas conductor between the accumulator and the mixing chamber, and a valve disposed in the housing and operatively connected to the rocker arm to reciprocate therewith, said valve when moved to one end position permitting the flow of gas from the gas manifold through the receiving chamber into the accumulator but cutting off the flow of gas from the accumulator through the conductor into the gas mixing chamber and when moved to the opposite end position cutting off the flow of gas from the gas manifold to the accumulator but permitting the flow of gas from the accumulator through the conductor into the mixing chamber, said valve having a portion which, during the intermediate movement of the valve, will seal off communication between the accumulator and the mixing chamber for a predetermined period after the inlet valve has opened to permit the flow of air into the engine cylinder.

10. In a dual fuel internal combustion engine a gas control system comprising an engine cylinder, an inlet valve for the cylinder, means for actuating the inlet valve, a manifold for supplying air under pressure, a separate manifold for supplying gas under pressure, a gas accumulator in communication with the manifold, means establishing communication between the accumulator and the engine cylinder, the combined volume of the accumulator and such communicating means being predetermined so that the supply of gas in the accumulator when expanded through the communicating means to the engine cylinder will mix with the combustion-supporting air to provide a combustion mixture of predetermined leanness, and a valve in such communicating means reciprocated by the inlet valve actuating means which in one end position will permit the flow of gas from the gas manifold to fill the accumulator but at the same time will seal off communication between the accumulator and the engine cylinder and which in the other end position will permit the flow of gas from the accumulator to the engine cylinder but at the same time seal off communication between the accumulator and the gas manifold, said valve in all intermediate positions preventing continuous communication between the gas manifold and the engine cylinder.

WILLIAM M. NICHOLS.

REFERENCES CITED

The following references are of record in the file of this patent:

UNITED STATES PATENTS

| Number | Name | Date |
| --- | --- | --- |
| 1,269,757 | Stevens | June 18, 1918 |
| 1,275,481 | Seymour, Jr. | Aug. 13, 1918 |